Sept. 9, 1969 V. H. JONAS 3,465,879

UNIT RECORD FILE SEPARATOR

Filed Dec. 28, 1966 6 Sheets-Sheet 1

INVENTOR
VICTOR H. JONAS
BY John J. McCormack
ATTORNEY

Sept. 9, 1969 V. H. JONAS 3,465,879

UNIT RECORD FILE SEPARATOR

Filed Dec. 28, 1966 6 Sheets-Sheet 2

BY John J. McCormack

ATTORNEY

UNIT RECORD FILE SEPARATOR

Filed Dec. 28, 1966 6 Sheets-Sheet 3

INVENTOR
VICTOR H. JONAS

BY John J. McCormack

ATTORNEY

INVENTOR
VICTOR H. JONAS

BY John J. McCormack

ATTORNEY

UNIT RECORD FILE SEPARATOR

Filed Dec. 28, 1966 6 Sheets-Sheet 5

INVENTOR
VICTOR H. JONAS
BY John J. McCormack
ATTORNEY

INVENTOR
VICTOR H. JONAS
BY John J. McCormack
ATTORNEY

United States Patent Office
3,465,879
Patented Sept. 9, 1969

3,465,879

UNIT RECORD FILE SEPARATOR

Victor H. Jonas, Winchester, Mass., assignor to Honeywell Inc., Minneapolis, Minn., a corporation of Delaware Filed Dec. 28, 1966, Ser. No. 605,324
Int. Cl. B42b *21/12;* G60k *21/02*
U.S. Cl. 209—80.5 2 Claims

ABSTRACT OF THE DISCLOSURE

A unit record storage magazine for storage of mass memory strips, together with record abstraction mechanism adapted for controlled strip selection (e.g. random access) by indexing of prescribed rods in strip notches, a strip returning mechanism and a strip separating assembly for continually directing a pressurized gas flow through the massed pack of strips so as to maintain them separated by a minute, uniform separation. The separating assembly is adapted to assume a removable, cover-like relation on the box-like magazine to maintain a constant, minute interstrip separation and keep the strips in flat, stable alignment even during jostlings such as occur in the course of random accessing when individual strips are subject to almost continual removal from, and then return to, the pack.

PROBLEMS, INVENTION FEATURES

Figure 1:
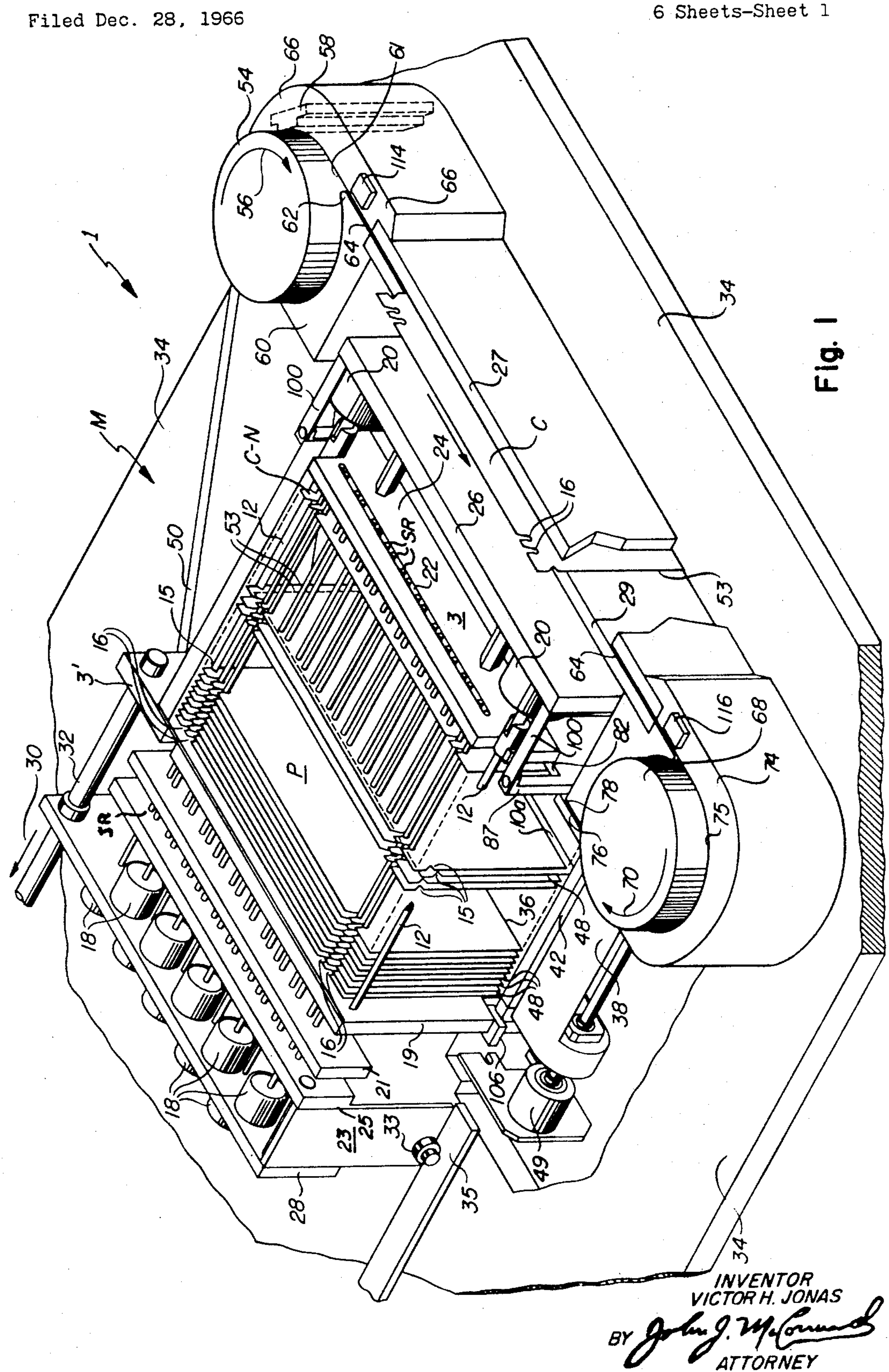

In the data processing arts, intense interest in random access data files has lately coincided with interest in unit record documents as data storage media, unit records having a flexibility of organization and reorganization, ease of updating, potentially small access time and the like. Consequently, randomly-accessible unit record files are becoming a real possibility for use in computer systems, for instance, to replace the sequentially-accessible data recorded on magnetic tape spools as is prevalent today. It will be understood that in a typical such storage device, a magazine will be provided to contain a pack of unit records (strips), each of which has a different set of coded notches provided along a prescribed edge. These strips may be automatically selected and removed by selection rods, selectibly engaged with these notches. Once selected, such a record strip is characteristically transported to data processing apparatus at high speeds, for instance, passing one or more data transfer heads, perhaps being recirculated, and then returned to the magazine. Since it is typically contemplated that such a record be selected, released, dropped, transported, operated upon, and then returned to the magazine—all within a small fraction of one second—it is evident that speed of record manipulation is vital to using such a file for data processing.

Compact strip packing is also important. For instance, it is usually necessary to pack the strips very closely to limit the size of the magazine. Yet it is also necessary to keep the closely-packed strips always separated by a miniscule spacing and out of contact with one another—thereby assuring unimpeded strip selection, with no abrasive contact with adjacent strips, etc. Thus, it will be apparent that with such a random access strip file, it is absolutely essential, for many applications, to maintain the closely packed record strips separated from one another by a prescribed spacing, however miniscule. The present invention is directed to such a unit record storage and processing apparatus and more particularly including associated strip separation means. More particularly, the invention provides such strip separating means through a structure which projects a pressurized, laminar fluid-flow against the strip pack in a prescribed manner.

In the art of designing random access record-manipulating machines of the type described, the requirement for packing record strips close together in a magazine presents problems. That is, with the very minute inter-record spacing desired (e.g. on the order of a few mils or less) the mechanisms proposed for separating these strips and maintaining them so have typically been all too complex; and in any case, have not been consistent with packing the records as close as desired. Most prior art approaches have presumed that to get, and maintain, this separation one must oscillate some mechanism (such as an air-jet supply nozzle) back and forth across the strip pack. The present invention provides separation means for such magazines employing no such moving parts, but merely using a very simple, flat, compact, gas injector structure, insertable conveniently as a cover upon a relatively standard magazine structure so that, broadly speaking, it functions as a kind of magazine cover through which pressurized separating gas is shaped into a particular flow configuration.

In some related prior art machines, it has been proposed that strip separation be provided by directing pressurized fluid in a turbulent air flow against the entire face of the strip pack. It is apparent to those skilled in the art that such an arrangement has all too many practical limitations, such as requiring extensive pumping equipment, an inability to achieve the aforementioned miniscule spacing and high packing density, and, further, often abuses the strips, such as by unnecessarily thrusting them against retaining rods. The present invention provides a strip separation and stabilization arrangement which differs from such a gross, turbulent-flow arrangement, rather providing a flow which is both segmented and laminar. That is, it directs a plurality of thin, carefully-defined laminar sheets of pressurized gas (e.g. air) against prescribed portions of the strip-pack, thus operating in a basically different manner and providing a decidedly different and superior separation mode.

Other related machines with these strip magazines have, on the other hand, tried to maintain some sort of strip separation, or at least periodically jostle the strips for easier removal thereof by such expedients as vibrating or jiggling the entire magazine—something entirely too crude and likely to soon destroy strip integrity, e.g. by tearing notches. Alternatively, designers have attempted oscillating a turbulent jet-flow back and forth across various portions of the pack. Both of these arrangements perform very unsatisfactorily, giving little or no adequate separation, inducing detrimental vibration of the entire pack and attendant apparatus, and impressing many undesirable stresses on the strips. Further, such expedients are unable to maintain uniform separation, to do so in a stable manner and employ complex (e.g. moving) elements which, besides being expensive, are subject to wear and failure. By contrast, the present invention achieves strip separation and related functions in a far superior manner without any one of the aforementioned disadvantages associated with such turbulent-flow or oscillating mechanisms and using a static segmented gas-inject system providing laminar flow.

Thus, it is a general object of the present invention to provide apparatus which exhibits the aforementioned features and advantages and is free of the above problems and objectionable characteristics, acting to maintain record strips in a pack, undamaged, and ready for quick selection and removal therefrom. A related object is to provide such apparatus whereby any predetermined card in a pack may be selected and abstracted quickly, and unimpededly, yet without significantly disturbing the relative separation of the other strips.

Still another object is to provide such a system for separating packed strips by impressing a laminar (non-turbulent) gas flow across one or more portions of the pack, bracketing all of the strips. A related object is to provide a fluid injection system and related magazine structure for containing such a pack so as to apply such a fluid flow against a facing pack surface and to thereby quickly separate the packed strips while maintaining them closely adjacent with only a prescribed minor separation between them. Another related object is to so separate such packed strips and to additionally maintain the strips at a stable, fairly constant spacing relative one another, although laterally translatable, and thus to fully utilize magazine capacity without bunching. A related object is to keep such strips in a stable, separated attitude despite external stresses, vibration and the like.

Still another object is to provide such a separating system using a relatively small simple gas supply means. Another object is to provide such a system using a relatively simple gas delivering and flow-forming conduit structure. Yet another object is to provide such a system using simply a conduit structure serving as a cover to a relatively standard strip magazine structure.

Another feature is to provide record separating means which has neither moving parts nor generate turbulent flow. Yet another object is to provide such a separating arrangement which is relatively simple and easily mated conventional magazine construction. Still another object is to provide such an arrangement using essentially only a flat, compact conduit chamber. Yet another object is to provide such an arrangement able to "break" a compressed pack of records, to maintain them spread just a few mils, yet to do so consistent with the speeds of data processing record manipulation. Still another object is to provide such an arrangement without need for extensive fluid-pumping capacity.

The foregoing and related objects, features and advantages of the invention will become more apparent from consideration of the following description, including the accompanying drawings, where one embodiment of the invention, oversimplified, generally comprises merely a box-like strip magazine and a conduit-cover therefor, the cover being provided with a pair of slits arranged to span the strip widths; being disposed relatively symmetrical along their length, this cover including a simple, compact plenum chamber for introducing laminar, pressurized air flow through these slits at a relatively uniform flow rate and uniform pressure along the slit-length.

More particularly this embodiment is adapted for a strip magazine incorporated in a random access data-strip processing apparatus, the magazine being adapted to retain a pack of record strips, selectably abstracted according to which selector rods are indexed, also including an air-flow-directing cover including air-entraining structure therein and being removably-fitted over one face of the magazine, there being an air-supply communicating with this cover. The pack-confronting face of the cover is slitted so as to apply laminar sheets of fluid against the pack for breaking, separation etc. of the strips therein. This pair of fluid-delivering slits is arranged to span the cumulative widths of the strips, each slit being constructed and disposed so as to deliver a sheet of pressurized air which laminarly impacts the pack face and then proceeds down along and between each of the respective strips and out of the magazine. These and other novel features, advantages and objects of the invention together with those related as appreciated by those skilled in the art will become more apparent from the following detailed specification with reference to the accompanying drawings relating to a preferred embodiment of the invention.

Figure 2:
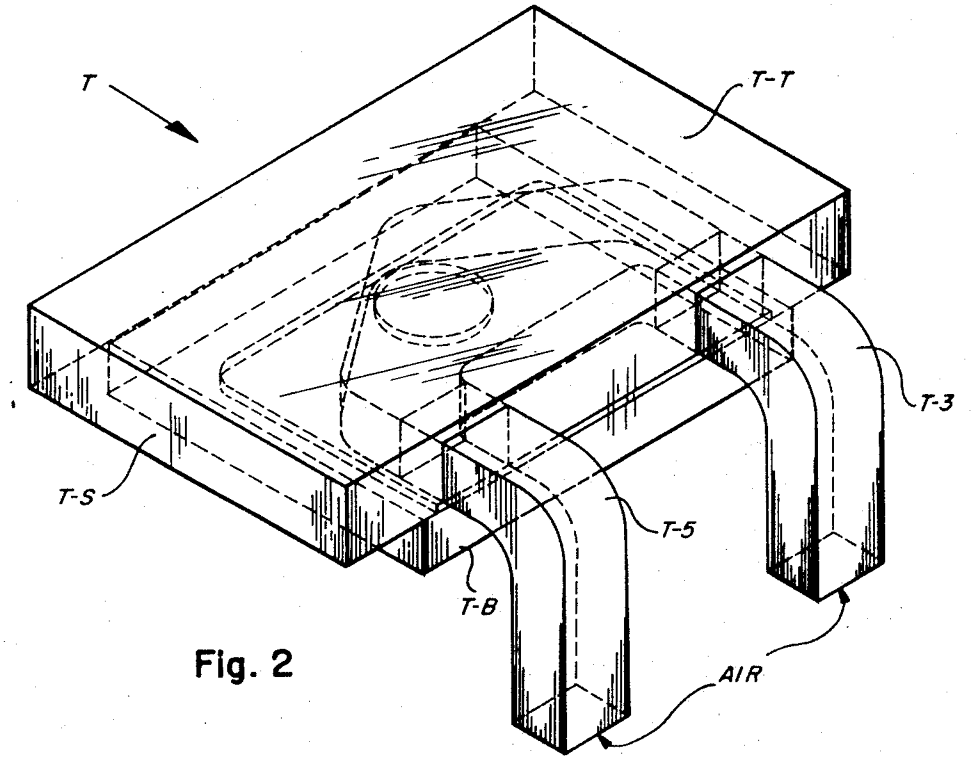
Figure 2A:
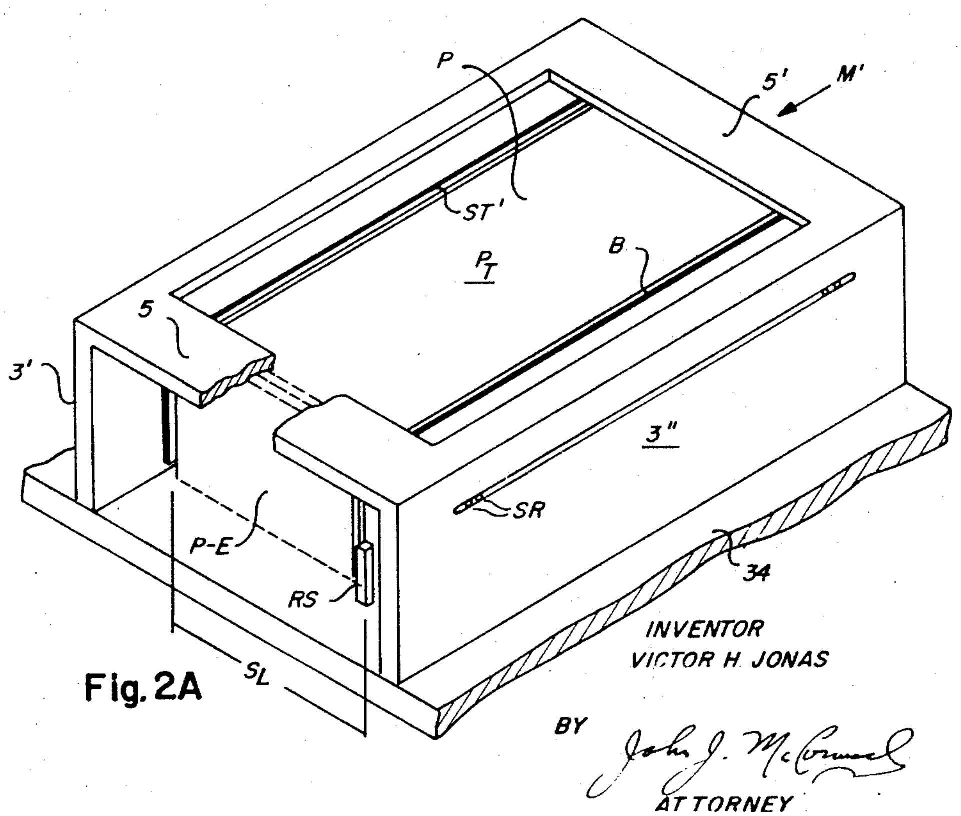
Figure 5:
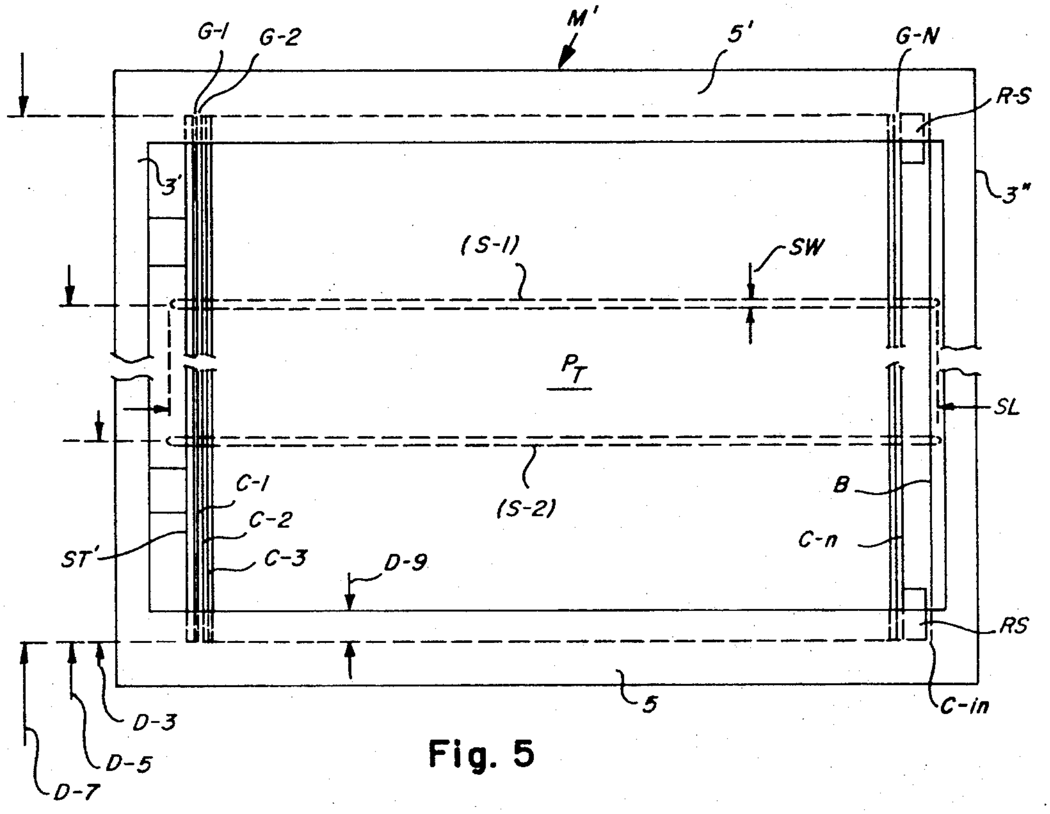
Figure 3:
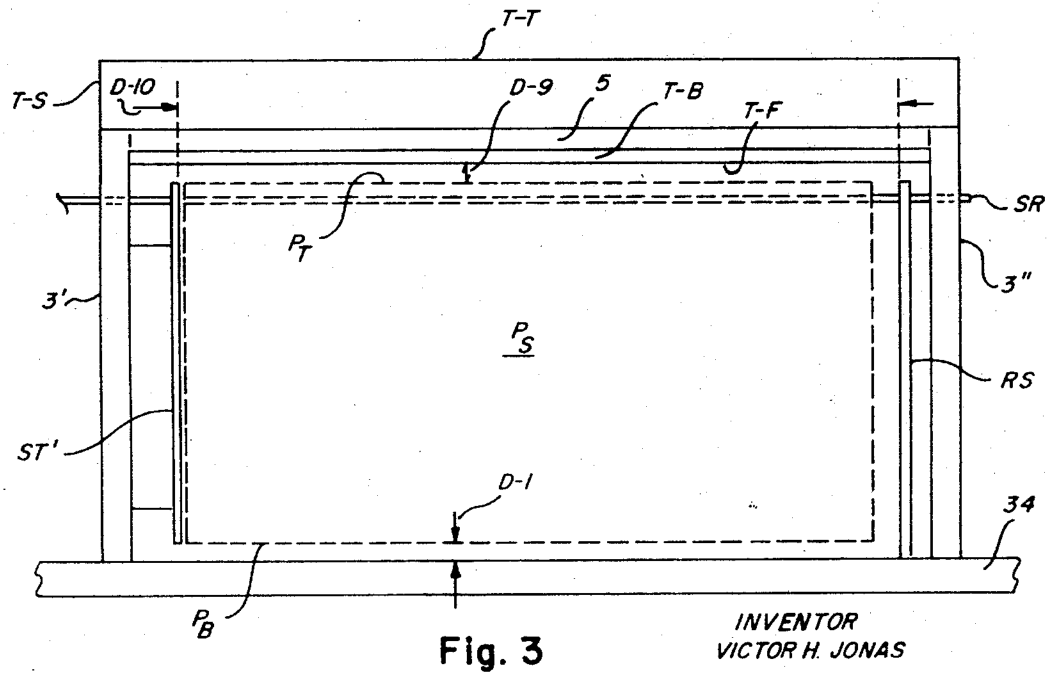
Figure 4:
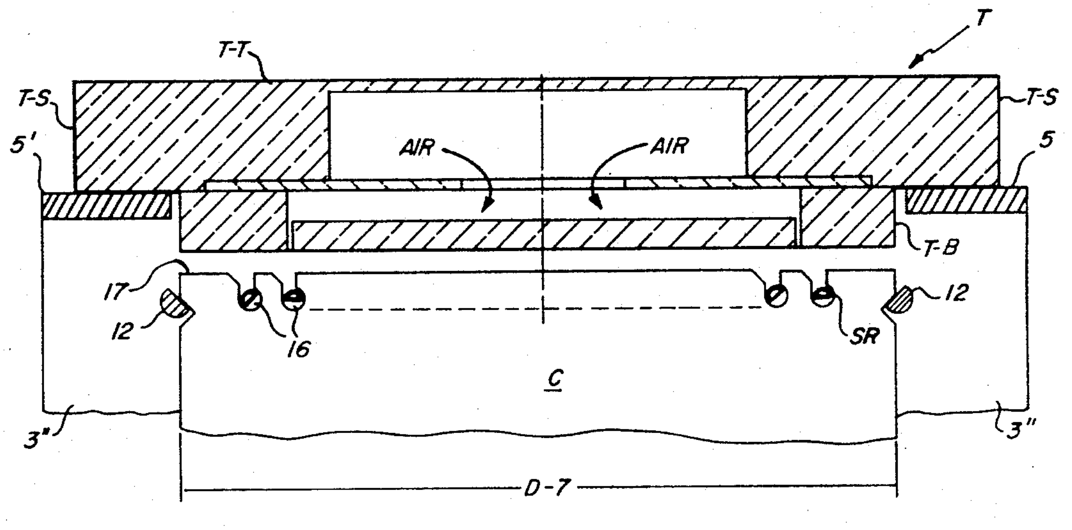
Figure 6:
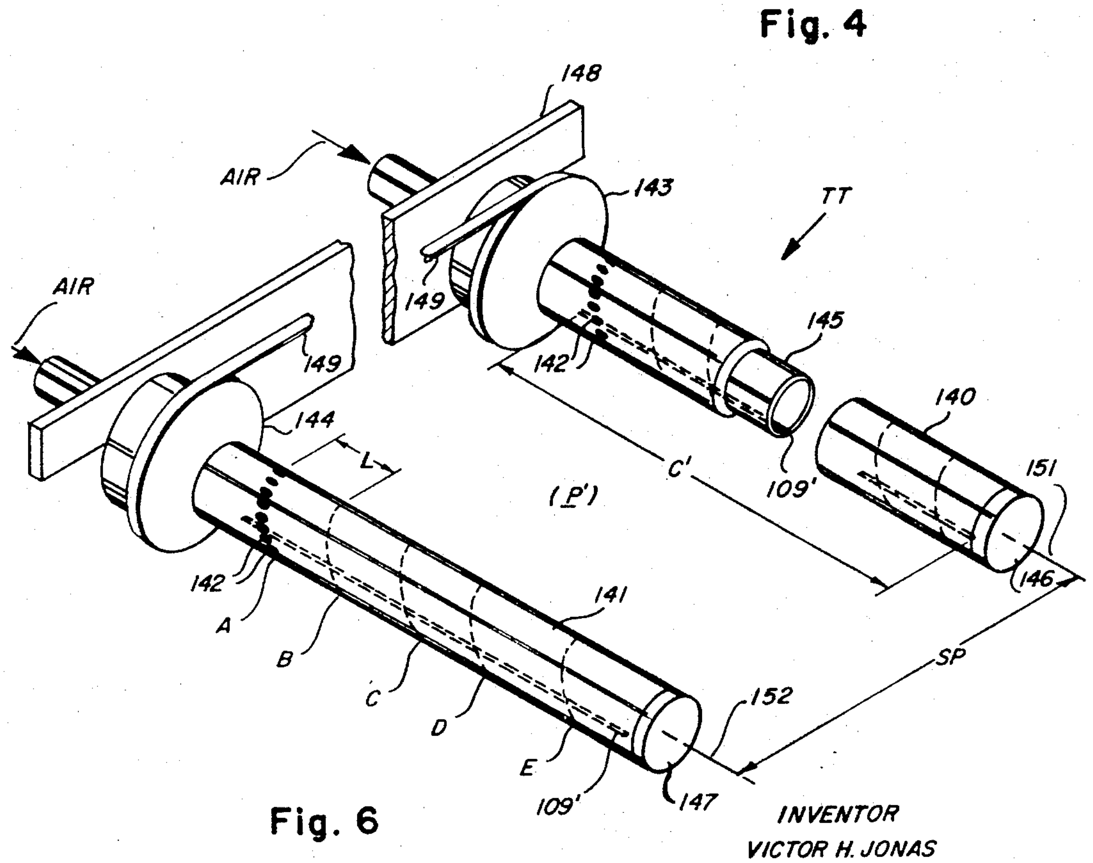
Figure 7:
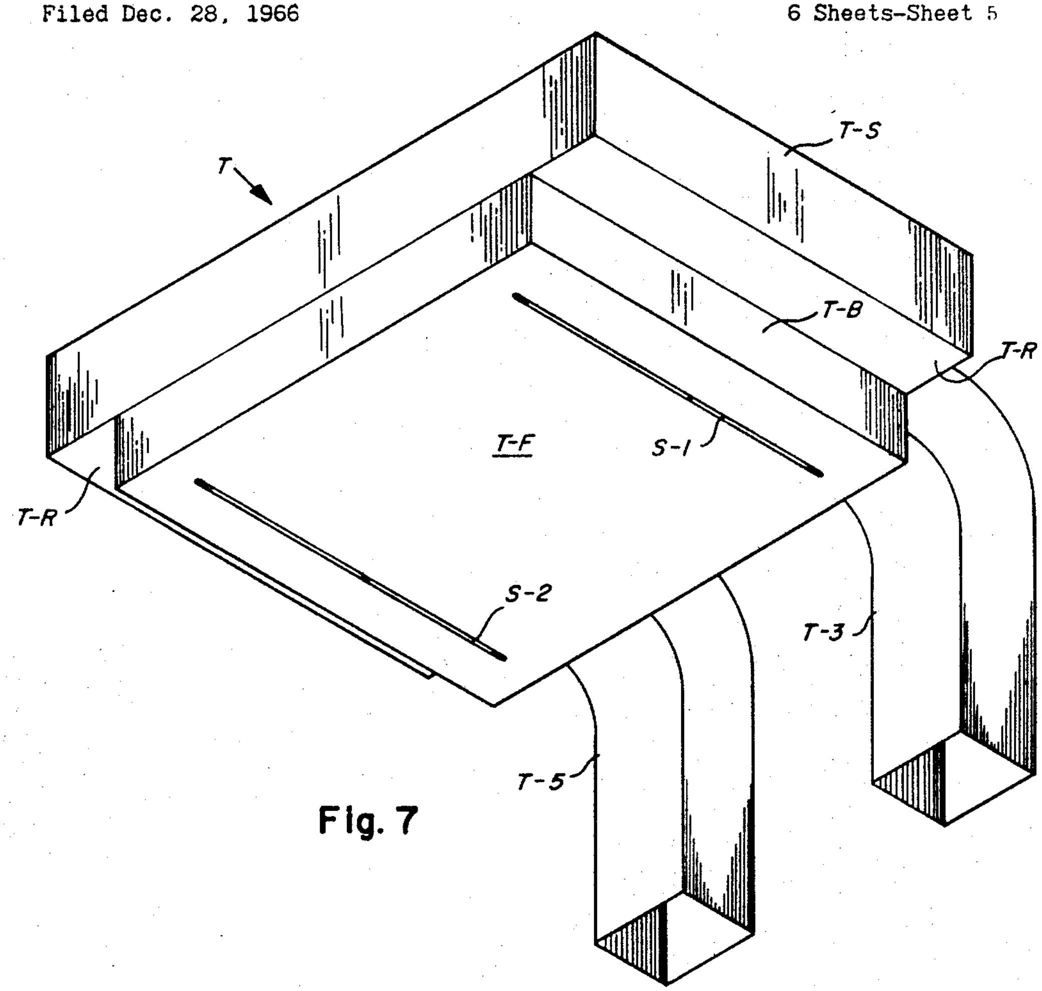
Figure 9:
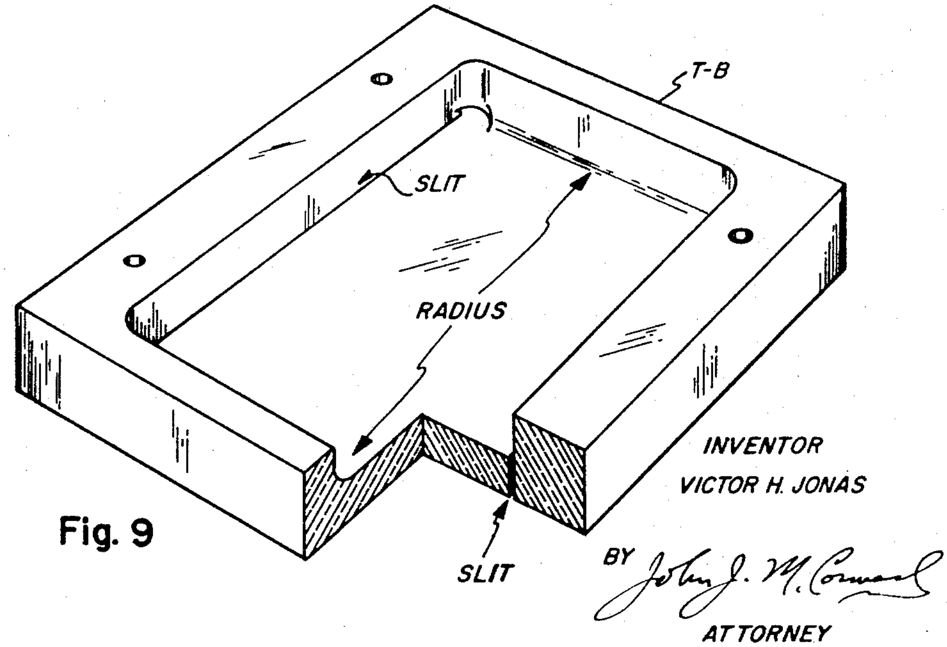
Figure 8:
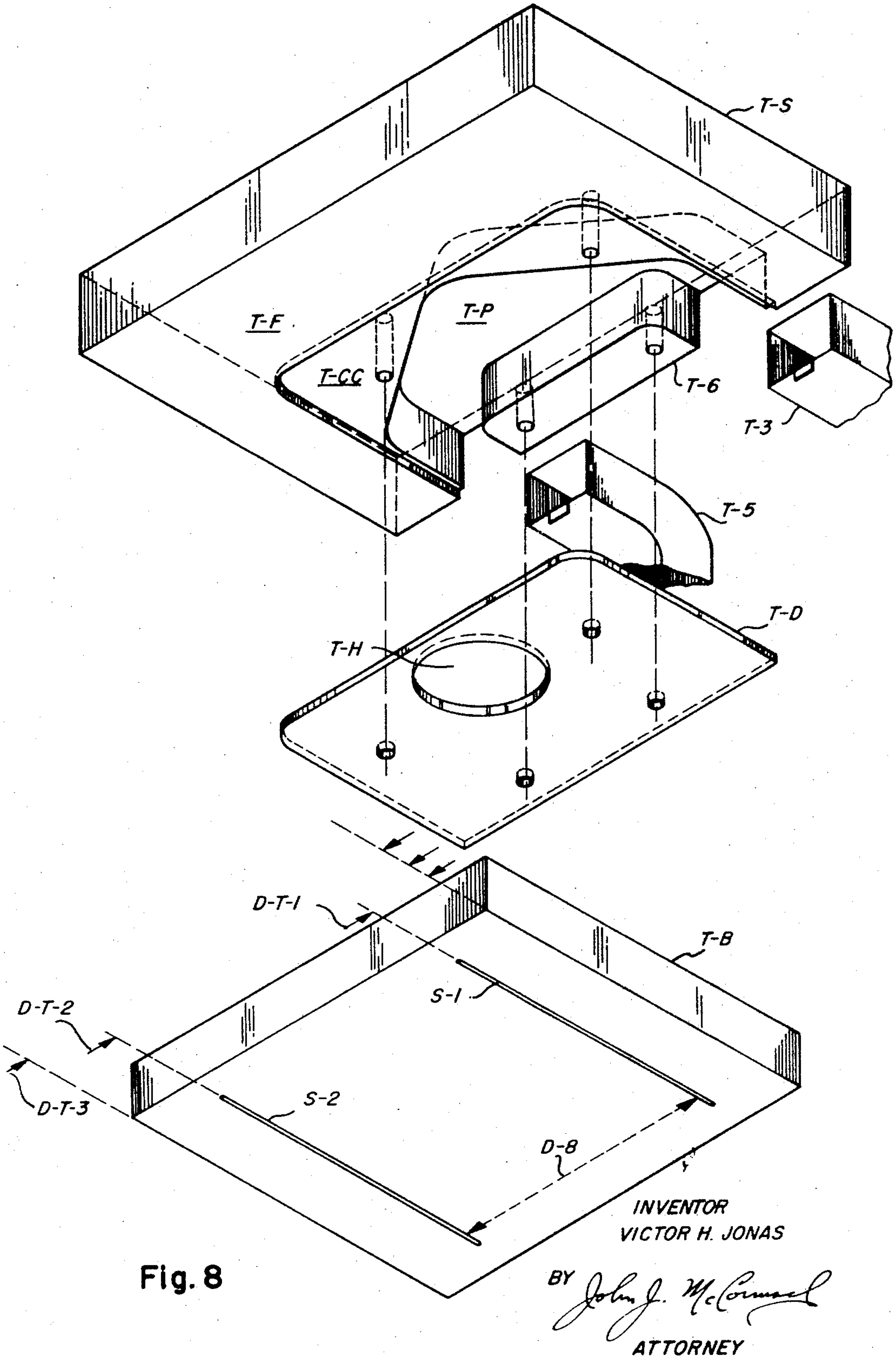

The drawings, wherein like numerals denote like parts, comprise:

FIGURE 1, a top isometric view of an exemplary random access data strip storage and handling apparatus of the type suitable for use with the present invention, various portions thereof being simplified and omitted for clarity;

FIGURE 2A, a fragmentary top isometric view of a strip magazine assembly similar to the storage portion of the apparatus in FIGURE 1 but somewhat modified;

FIGURE 2, a top isometric view of a conduit-cover according to the invention, adapted for mating with the magazine of FIGURE 2A, being indicated as exploded-away therefrom;

FIGURE 3, a schematized side elevation of the magazine assembly in FIGURE 2A looking toward the face (vs. edge) side of the strip pack indicated therein, in phantom, plus associated retaining means and cover;

FIGURE 4, an enlarged sectional view of the upper portion of the arrangement in FIGURE 3 with selection rods also exemplarily shown;

FIGURE 5, a rather schematic plan view, somewhat enlarged, of the magazine assembly in FIGURE 2, with superposed fluid injection slits (in the conduit-cover) indicated thereon, in phantom;

FIGURE 6, an isometric, fragmentary and greatly simplified top view of an alternate fluid-injection assembly embodiment adapted for use with magazines similar to that of FIGURES 2–5 and adapted to function in place of the conduit-cover of FIGURE 2;

FIGURE 7, a bottom isometric view of the conduit-cover in FIGURE 2;

FIGURE 8, an exploded, isometric view of the parts of the cover in FIGURE 7; and FIGURE 9, a top isometric view of the base element of the cover in FIGURES 7 and 8.

MACHINE ENVIRONMENT

FIGURE 1 indicates a mass memory data processing apparatus 1 of a type suitable for incorporating strip-separating means according to the invention. While certain features of the subject apparatus and its operation are discussed hereinbelow, such apparatus and operation are fully described in Patent No. 3,307,557, which is hereby incorporated by reference. Apparatus 1 is adapted to randomly store a group of unit record (data) strips C in a pack P in a storage magazine M. Strips C are edge-notched as known in the art so that any code-selected one thereof may be automatically abstracted from the pack to be transported and manipulated (e.g. interpreted, read at head 58) and returned at ultra-high speeds, yet with no attendant damage thereto. Strips C will here be understood as being manipulated by translation about a path (circuit) roughly defined by guide wall 50, transport drum 54, guide wall 27 and drum 68 and returned to one end C–N of pack P in magazine M. Strips C will be seen to be insertable in a compressed pack into magazine M which, in accordance with the invention, is generally adapted to very quickly separate (separator not shown) the strips from one another and maintain them separated by a prescribed small uniform gap, despite stress forces being applied to the strips (e.g. by abstraction, selection and return forces) or applied to the surrounding apparatus (e.g. motor vibration at magazine).

STRIP MAGAZINE OPERATING ENVIRONMENT

As known in the art, strips C are substantially rectangular (detail indicated in FIGURE 4) and are suspended in the storage magazine by known retaining/select means. A typical version of such a magazine, M' (FIGURES 2A and 5) includes notches 16 along one edge 17 of each strip. Typical strips C may be understood to be on the order of about 3.3 x 7.4 x 0.006", though, obviously, a wide range of shapes and sizes may be employed. However, the invention is especially advantageous with very thin elongate strips which are especially problematical for prior art devices. Retainer notches 15 are aligned for registry when strips C are gathered into a pack P in a magazine so as to all be selectively, releasably, retained along respective rods SR, also being notched at 15 for engaging retainer rods 12, as shown. Selection rods SR are aligned along a horizontal plane intersecting walls 3′, 3″ of magazine M′, being operable, as known in the art, to selectively release any code-selected strip. For the sake of clarity, only a limited number of notches 16 is shown, it being understood that in actuality notches will usually be disposed along most of the strip edge 17. As will become apparent from the discussion below, the number of notches determines the number of strips in the stack from which random strip selection is made, a separate selection rod SR engaging each registered column of notches 16. For the sake of propaedeutic illustration, only a limited number of strips is illustrated in FIGURES 1, 5, etc., whereas in practice, strips will be stacked all along the length of the rods 12, SR also being packed closer together than it is possible to illustrate (drawings not to scale).

Opposed wall plates (3, 19, FIGURE 1; or 3′, 3″ FIGURE 2A) may rotatably support rods SR, 12 and may confine opposed ends of the pack P. However, preferably a stiff card or stop plate ST′ (FIGURE 3) confines one end of pack P while the other is confined by stop-spacers RS, RS′ projecting from wall 3″, as shown in FIGURES 2–5. Spacer RS may function as a mechanical gate to admit returned strips to one end of the pack, as understood in the art and explained hereinbelow. Each strip C is a data record and may have one magnetizable surface on one side and an opposing conductive coating (e.g. carbon) on the other side for dissipating friction-induced static charges, etc. As understood in the art, data may be recorded on the magnetizable card surface in the form of discrete magnetized spots disposed in parallel tracks to be read by head 58, etc.

For magazine M in FIGURE 1, wall plates 3, 19 may be mounted above a working surface, or transport deck, 34. A solenoid 20 supported on a mounting plate 26, may be mechanically coupled to one end of each holding rod 12, as exemplarily shown, so as to controllably rotate its respective rod for strip selection. Wall plate 3 may contain a slot 22 in which the ends of selection rods SR are received so as to permit the rods to rotate. At the other end, rods SR extend through the plate 19, through an intermediate support plate 21 and beyond to a support assembly 23, including front and rear plates 25 and 28, respectively. A set of rotary solenoids 18 is mounted on the assembly 23, in staggered relationship, on both sides of plate 28. Selection rods SR are extended to engage solenoids 18, being mechanically coupled thereto. Supporting assembly 23 forms a carriage which is adapted to be moved in the direction of the arrow 30 when it is desired to withdraw the rods SR so as to replace a strip stack P, bar 32 being pushed to effect this withdrawal. Carriage 23 moves on a pair of rollers 33 along corresponding guide rails 35 positioned on opposite sides of the carriage.

Turning to FIGURES 2 and 2A, a magazine assembly M′ (similar to magazine M) is shown, and in greater detail. Magazine M′ is adapted to mate with an air-directing means according to the invention, i.e. to conduit cover T (shown exploded away therefrom). The magazine structure M′ is defined by a pair of end-walls 3″, 3′ mounted from base deck 34, walls 3′, 3″ being connected by a pair of side-rims 5, 5′, extending orthogonally therebetween (see FIGURES 3, 4, 5 also). Strips C are suspended (as with aforementioned magazine M) within magazine M′ upon hold-rods 12 and select rods SR, being spaced uniformly therealong to comprise a "spread" pack P ($c_1$–$c_n$ therein— cf. FIGURE 5). Pack P is defined by a base face $P_b$, spaced above deck 34 parallel thereto at a prescribed elevation distance D–1 and a parallel, opposed, top-face $P_T$, with a pair of parallel end-faces P–E therebetween. Strips $c_1$–$c_n$ are constrained in magazine M′ to be parallel (normal to magazine length direction SL—FIGURE 2A) and separated by a prescribed uniform gap (G–1, G–N—FIGURES 5), by stop ST′ at one end of the magazine and gate stops RS, RS′ at the other end. The magazine length $S_L$, between stops is preferably adjustable as necessary. As suggested above, return-pusher bar B is adapted to re-insert selected and returned strips into pack P, e.g. pushing returning strip $c_{in}$ against end strip $c_n$, the latter being engaged therewhile stoppingly against fixed gate-stop RS and strip $c_{in}$ being snapped resiliently past the latter stop to be incorporated into pack P.

In view of the foregoing, workers in the art will appreciate that the general purpose of the overall storage assembly including magazine M′ and mating cover T, plus associated air-inject means, is to evenly, but minutely, space the individual strips C along magazine length SL and to maintain this separation during card selection, withdrawal from, and return to the pack, and despite other various stresses upon the pack. Thus, cover T injects laminar films of air, or like suitable separating fluid, against pack P within magazine M′ so as to "break" a compressed pack, establishing the prescribed minute spacing and maintaining it despite stresses, so a strip may drop freely onto the transport deck 34 when selected, etc. Separation is also quickly re-established after a pack-compressing strip-return operation. More particularly, this general purpose is here implemented by providing a box-like magazine M′, which is relatively conventional, being adapted to receive and separate a (compressed) deck of about 200 to 400 strips C. Magazine M′ has an effective width D–7 (FIGURES 4, 5—extending between side-wall rims 5, 5′, somewhat thereunder) corresponding to the card length (here, about 7.4 inches) and a length D–10 (here about 4.8 inches) defined between stops ST′, RS, RS′, projected from end-walls 3″, 3′. This length D–10 determines the maximum pack-width (along direction SL, FIGURE 5, not to scale). Pack-width is defined by stops ST′/RS, RS′, and will correspond to the sum of both the aggregate card-thicknesses and the inter-card spacings according to the number of cards in the prescribed maximum pack (e.g., pack-width is about 4.7 inches for about 200 to 400 cards, each .006″ thick and separated by uniform spacings in the range of from about .006″ to about .018″). Magazine M′ will thus only accept card packs having a compressed overall thickness within a prescribed range, about ¼–½ the length D–10 (i.e., here, from about 1.2″ to about 2.4″ for the 200 to 400 cards as ordinarily stack-compressed). Pack-width may, of course, be adjustable by shifting the stops. A feature of the invention is that a single storage assembly can accommodate a wide range of pack sizes and still space them uniformly, automatically adjusting the inter-card gap accordingly.

The storage assembly which includes magazine M′ and mating cover T, as a feature of the invention (detailed below), is better adapted to quickly "break" such a compressed pack, i.e., to spread them part, often expanding the pack width as much as four times or more, with the strips relatively uniformly spaced. It is also adapted to keep the strips uniformly spaced within the prescribed range of miniscule gaps. Further, it can maintain this separation stabilized, despite external disturbances of the pack, such as when a selected card is dropped from pack P or when it is returned and re-inserted—all the while preventing contact of machine parts with the cards, or the cards with one another. Cards must be kept below a prescribed maximum temperature (here about 110° F.) to prevent undue expansion of the card material, such as may lock a card-notch against the select rods, as workers in the art know. Another feature of the invention is that separating fluid (air) may provide this cooling function. Another feature of advantage is that it is found that such a separating air stream also stiffens and stabilizes cards in a pack, such as against any significant swaying or shaking during the shock and vibration impulses to which a Mass Memory apparatus is often subjected (e.g., from the mechanical vibration of pumps, select means, etc.). Another feature is that this steady flow of pressurized separating air tends to maintain the magazine interior at "above-ambient" pressure, thereby discouraging intrusion of contaminant particles (e.g., dust).

PRIOR ART

Various systems have been proposed for directing a fluid toward a pack of record strips for purposes comparable to the aforementioned separating functions, at times to expedite removal of a strip from a pack, such as keeping strips "unstuck" from static electricity. Early proposals involved crude mechanical means for vibrating (jiggling) the magazine. A "static" arrangement (no moving parts) has also been proposed for simply directing a massive stream of pressurized air against one entire face of the pack. These proposals are totally inadequate for the purposes of the invention.

Alternatively, to improve efficiency of strip separation, a different, more "dynamic" arrangement (moving parts) has also been proposed whereby a turbulent (air jet) stream is swept oscillatingly across a segment of a document pack, effecting this by reciprocating an air nozzle. Whether one uses the aforementioned static separator arrangement or the dynamic types, there are certain crippling disadvantages preventing attainment of the instant purposes, especially where data processing applications are involved that typically have high strip-transport velocity, low strip-mass, high strip-packing density and the like. For instance, the aforementioned static system obviously requires an enormous fluid "throughput," thus requiring expensive (uneconomic) pumping capacity; moreover, it performs poorly. The dynamic system may be somewhat more economical of fluid-flow but has other serious problems, one being that it requires an assembly of rapidly-moving parts and thus is subject to severe wear, maintenance and life problems, has speed limitations, etc. Most importantly, however, no such prior art system is able to "break" the pack quickly and evenly; to establish the aforementioned miniscule uniform gap or to maintain this gap separation, despite disturbing impulses.

ROTATING TUBE SEPARATOR

Dissatisfaction with the aforementioned dynamic "oscillating-nozzle" system led to experimenting with novel "rotating-perforated-tube" separators for directing fluid-flow against the strips in a pack. Such a separator arrangement TT is illustrated in FIGURE 6 and appears to simulate a "nozzle" system; however, operating more efficiently, more effectively and in a very different mode. Separator system TT will be generally understood to comprise a pair of slotted, hollow cylindrical conduits 145 which are fixedly mounted from a portion 148 of a machine frame to be aligned along parallel elongate axes 151, 152 respectively. A pair of concentric, surrounding pulleys 143, 144 are bored to be rotatably mounted about each of conduits 145. A pair of perforated hollow cylinders 140, 141 is affixed to pulleys 143, 144 respectively to project concentrically along a respective conduit 145, at least along the slotted portion 109' thereof, i.e. along slot-length C'. Cylinders 140, 141 are identical, each having a row of like holes 142 of prescribed diameter extending in regular, helical fashion along slotted length C'. This pattern of holes is arranged to have a prescribed uniform pitch segment L such as will establish a prescribed frequency of turbulent jet-stream oscillation (one oscillating-jet zone for each length L) across the pack P' thereunder (not shown) given a prescribed rotational drive speed. Cylinders 140, 141 are closed at their free ends by plugs 146, 147, respectively, being closed at their opposite ends by their attachment onto respective pulleys 143, 144. Pulleys 143, 144 are adapted to be rotated synchronously by a common drive means; for instance, by a timing belt 149 driven by a drive pulley and associated drive means (not shown), as known in the art. Conduits 145 are mounted as to be parallel along respective axes 151, 152 (also the axes of rotation for 146, 147, respectively) and separated a prescribed distance SP. Conduits 145 extend through frame 148 to each being coupled to supply means for injecting air at a prescribed pressure and flow-rate by a pressurized supply system (not shown, e.g., a pump).

In operation, injection arrangement TT is mounted above the associated unit record P' (e.g. in a magazine like M' in FIGURE 2A) so that, with the belt/pulley drive rotating tubes 140, 141 at a prescribed speed, with the air being injected along conduits 145 at a prescribed pressure and flow-rate, a sheet of air from each slot 109' will so interplay with the cylically passing holes 142 in hole-set that parallel air-jets will sweep across the confronting face of pack P'. This pattern of synchronously scanning air-jets can be made to oscillate at a prescribed frequency along axes 151 and 152 to periodically pulse ("riffle") each card therein. More particularly, using such an air-jet injection system with a magazine like M' in FIGURE 2A, it was found that: if holes 142 were made about 20 mils diameter, with a pitch L of about .7 inch, with the overall perforated length C' of 5 in. (being somewhat greater than the magazine length SL and comprising 240 holes thereby bracketing all the cards), with the conduit axes 151, 152 located at about ¼ and ¾ across the length of the pack, respectively, with cylinders 140, 141 about 0.62 in. OD surrounding conduits 145 of 0.5 in. OD and rotated at about 300 r.p.m. and with an air supply of about 2 c.f.m. and 30–60 p.s.i., it was found that some record separation was derived, somewhat superior to that from a simple oscillating jet nozzle.

PROBLEMS AND VARIANTS

Some problems remained however. For instance, it was noted that this arrangement tended to "bunch" the cards, that is, to gradually and constantly move them toward one end of the magazine where there were several continually changing zones, leaving the rest of the magazine unoccupied. Interestingly, however, the direction of translation appeared opposite to the direction of air-jet progression. This imbalance may be corrected by providing a second, oppositely-perforated cylinder (and air-injecting internal conduit) beside each indicated cylinder 140, 141 and similarly rotating it.

As an alternate to the air injection system TT, tubes 140, 141 were kept stationary (non-rotating), to effectively provide a single row of uniformly (rather widely-) spaced holes below the air slot outlets 109'. As a second alternative modification, the tubes were then flexure-mounted and oscillated longitudinally (along axes 151, 152) by an eccentric cam at about 240 r.p.m. (¼" stroke). This produced no significant separation effects and moreover, gave rise to a troublesome, periodic swaying of the entire deck, rather than the desired, "riffling" of individual cards. Other variations on the static (non-oscillating, non-rotating) tube were tried, such as using a relatively square tube with a plurality of longitudinal rows of evenly-spaced holes (a number of different hole-patterns being tried) with a resulting improvement in separation over dynamic devices but still without achieving the desired separating effects.

SLOTTED COVER SEPARATOR

As a result, I turned my attention toward eliminating turbulent flow, such as with the air-jets from the aforementioned perforated structures and also toward eliminating any attendant rotational or oscillational means. Thus, it happened that I employed simply a pack-covering top, or conduit cover, such as T (FIGURES 2, 8) with a pair of elongate slots such as slots S–1 and S–2 for entraining a pair of constant (non-oscillating) air streams of the laminar (non-turbulent) type, as in my preferred storage assembly (i.e. magazine M' together with cover T).

Preferred fluid-injector unit T will be more completely described hereinafter, being understood to generally comprise an air-tight, relatively box-like fluid-directing conduit, or plenum, defined by four sides T–S joined by a conforming top T—T on one side and a slitted base T–B, and surrounding base rim T–R, on the other side. T–R is intended to engage the top surfaces of mazagine walls 3′, 3″, 5, 5′ while base T–B fills the space defined thereby in air-tight manner. Plenum T is adapted to be coupled to a pair of like fluid inlets T–5, T–3 from fluid supply (pump) means (not shown) and includes a pair of inner conduit chamber means, each being adapted to direct the separating fluid flow from an inlet to a respective ejection slit S–2, S–1 so that the latter may each project a laminar (nonturbulent) uniform-pressure, uniform-flow sheet of air relatively normally against the top face $P_T$ of pack P.

I found that several parameters of such a static slitted-cover arrangement were critical to deriving satisfactory record separation. I found that the slit-length SL must be longer than the effective width of the pack "as separated"; that is, preferably extend beyond the maximum magazine length D–10 (FIGURE 3) a minor "overhang" distance (e.g. 30–40 mils) to prevent bunching. Also, the slit width SW must, of course, be considerably less than slit length SL, since otherwise the fluid-flow emanating therefrom will be turbulent (i.e. not laminar, as with a symmetrical cross-sectioned, or circular, hole). Turbulent flow was found quite undesirable for effecting the desired results. Workers in the art will, by observation etc. readily determine how small the width SW of the slits must be to derive the necessary laminar flow for a given apparatus (for instance, depending upon the air pressure and flow-rate used). I found, for instance, that width SW had a pronounced, and rather critical, optimum of about 45 mils and a very critical minimum of about 30 mils, the flow being ineffective below this width.

It will also be apparent that slits S–1 and S–2 must be located to be reasonably free of obstructions of a free fluid flow-through between all cards in pack P. For instance, the slits should not so confront an obstruction (such as a select rod SR) that this flow is prevented anywhere. Further, the position of cover-base T–B (face T–F thereof) should locate the slits closely adjacent the suspension edge of the cards, that is, adjacent the top face $P_T$ of the pack (gap D–9, FIGURE 3) since this is the region of frictional drag on the cards as exerted by select rods SR, hold rods 12, and the like. Locating the air-injecting slits any great distance from this drag-region (i.e. adjacent a different face of pack P) would likely produce a greater or less amount of undesirable card twist and possibly disable the fluid-injector system.

As indicated below (for instance, with respect to FIGURE 3), this cover/pack gap D–9 must also be kept quite small (about 5–10 mils or less) so as to maintain the air flow laminar as it enters face $P_T$ between the cards, preventing any appreciable (lateral) diversion of the flow since this leads to turbulence. As stated the flow must enter the pack laminarly, though it may thereafter become turbulent in exiting. It was further discovered that one should locate slits S–1 and S–2 along the length D–T–3 of base surface T–F to be, both, equidistant from, and normal to face $P_T$ as well as symmetrical about the center thereof (of length D–T–3) so that relatively equal twisting moments are produced about the card and thus no card bending is induced. For the apparatus shown in FIGURE 8 it was found best that each slit be located at about ¼ card length from the edge of the magazine, e.g. slit S–2 be located about ¼ across length D–7 or D–T–3 (i.e. at length D–3 or D–T–2) and slit S–1 be located about ¾ along length D–7 (i.e. at D–5 or D–T–1). Though this orientating was not too critical, it will be apparent that it will usually be necessary to keep bowing moments from developing. The following values were satisfactory: D–7 at about 7.4 in. and SL about 4.5 in.

Several significant constraints with respect to the air supply and associated entraining conduit structure were also noted, according to other features of the invention. In general, it was discovered necessary to supply the fluid so as to emanate from each slit to impact the confronting pack face $P_T$ relatively normally, to prevent bunching of the cards at one end of the magazine. It is also necesary to maintain a smooth streamlined laminar flow into the pack as aforediscussed. Particularly, it was found necessary to keep the fluid pressure (e.g. at the pump) only as high as was required to maintain continuous fluid air flow through the pack, that is, so the air would flow down along each card to emerge adjacent the bottom face $P_B$ of the pack. Pressures much higher were not helpful and, at times, undesirable due to resulting turbulence, heat generated, etc.

It was also found that sufficient flow (cubic feet per minute) must be provided to separate one card from its neighbor ("break it") and keep it so. For instance, the fluid force must overcome the drag experienced by the cards as they are slid along rods SR 12. A satisfactory range of air pressure was from about 16 to about 41 inches of water with a flow-rate of from about 30 to about 48 c.f.m. It is also necessary to entrain the fluid (e.g. through an entraining chamber such as plenum T, or the equivalent) so that it presents a uniform pressure and flow rate along each slit as it emerges to impact pack P in the aforementioned normal, laminar flow-mode, with relatively no pressure or flow gradient along the slit. Plenum chamber T is compartmentalized to provide such entraining as described in detail below. It is best, for this purpose, to introduce the fluid for each slit along smooth, streamlined entraining conduits to minimize turbulence and so as to confront the respective slit, relatively central therealong and also obliquely (not directly thereabove). If air is not introduced centrally of slits S–1 and S–2, card separation will occur, but will be unbalanced, causing unequal inter-card gaps along the pack-width, there being a resultant unequal pressure and/or flow-rate along the slit. Another feature of the air injection and pumping system was that the air must be kept from becoming so hot as to appreciably expand the cards, for instance, such as will "lock" them on select rods SR.

As aforementioned, another characteristic of cover assembly T is that it must cover the entirety of the confronting pack face $P_T$ (except for slits S–1 and S–2) and moreover be offset therefrom a prescribed minor gap D–9 (FIGURE 3) so that rim portion T–R surrounding this gap zone mates with magazine M′ to assure that substantially all the air from slits S–1 and S–2 flows down through the pack P with none escaping and no turbulence introduced. It has been noted, however, that the laminar flow projected at the confronting pack face $P_T$ quickly does its separating work adjacent the top of the cards as it proceeds downward toward bottom, and soon becomes turbulent as it passes along the cards, but without any apparent deleterious effects, due to dispersion of the flow stream, evidently. This entraining of fluid flow is furthered by enclosing all but the bottom of magazine M′. That is, it is preferred, although not necessary, that closed sidewalls be provided along the side faces $P_S$ of the pack P, these walls extending down from contact with rim T–R (or side-rims 5, 5′) along a major portion of pack sides $P_S$, terminating adjacent the bottom pack face $P_B$ and short of contact with deck 34. It will also be apparent that, since the fluid will exit adjacent pack base $P_B$ the aforementioned prescribed minimum-clearance, D–1 should be provided between $P_B$ and deck 34; for instance, being about 0.25 in. (without side-walls; with side-walls about .75 in. min.) to provide a sufficient pressure drop for a good high rate of fluid flow through the pack. Otherwise, other equivalent exit means must be provided. In the instant case, it becomes especially convenient to accommodate this clearance, since it is already necessary for clearing the card-removing means as indicated above.

The characteristics of cover T will be more particularly appreciated by consideration of FIGURES 7 and 8 together with FIGURE 2, showing, respectively, an isometric bottom view and an exploded view thereof. Of course, cover assembly T as illustrated is merely exemplary and may take other forms, dimensions and configurations adapted to provide the aforementioned functional characteristics of the injected fluid supply. In general, it will be seen that base T–B and top portion defined by sides T–S and top T—T, both define "coverless" chambers, sides T–S being apertured along one portion thereof to communicate with conduits T–3, T–5 as aforementioned. Base T–B is, of course, configured to fill the space in magazine M′ defined by sides 3′, 3″, 5, 5′ as aforementioned, while the cross section of the upper cover portion within sides T–S may be greater or less than that of T–B, as long as the rim is provided at the interface therebetween positioning the cover assembly T on top of magazine M′, and as long as the aforementioned fluid inlets are accommodated. In any case, a partition T–F is provided such as attached to sides T–S, a portion thereof T–D being removable, being attached to chamber-forming partition T–CC attached to cover T—T top or the like. Partition T–CC is preferably streamlined and contoured to provide a prescribed plenum chamber T–P relatively centrally of slits S–1 and S–2 in base T–B. A streamlined inlet partition T–6 is also provided, preferably, to assist in this streamlining adjacent the zone of communication with inlets T–3, T–5. Removable cutout T–D is provided with a bore T–H of prescribed diameter relatively centrally along the length of slits S–1 and S–2 and relatively equidistant therebetween being oblique thereto, that is, not directly superposed directly thereover. T–H will be sufficiently large to provide the aforementioned laminar flow, pressure and flow-rate as known in the art.

Those skilled in the art will recognize that cover assembly T aforedescribed thus provides an efficient inexpensive, easily removable entraining chamber between the point of fluid injection and magazine M′. Cover T is, of course, somewhat versatile, being replaceable, for instance, with a larger cover including larger conduits or with a direct connection to a pump for higher flow rates, cover T may also have separation slits of different size, location, etc. to accommodate packs of different widths, different lengths and the like. Cover assembly T as a whole will be airtight fastenable to magazine M′ easily and quickly.

From the foregoing description and illustration of a preferred embodiment of the invention, it will be clear that the invention is not limited to the specific features disclosed. For example, the card transport and other manipulating means may be readily modified. By the same token, the card-retaining rods 12 and selection rods SR may likewise be modified or substituted for by other equivalent card-retaining means. Further, magazine M′ may be modified to take other equivalent forms, such as by providing air-inlets on one or both of the pack sides rather, than the top of the pack, being adapted for attachment there of fluid-injection means comparable to cover assembly T. Similarly, cover assembly T may be modified in various ways, for instance, to employ a single, rather than a pair of, fluid-injecting conduits T–3, T–5, these also being introduced into the cover along different surfaces thereof rather than through the indicated side. In certain cases, also, more than one pair of slits may be provided, though this will usually be avoided as requiring too high a pumping throughput and decreasing efficiency of operation. It is probably preferable that the cover T be located at the top of the pack so as to use gravity to assist the down-flow and alignment of the cards however. It will be apparent from the foregoing disclosure of the invention that numerous other modifications, changes and equivalents will now occur to those skilled in the art, all of which fall within the spirit and scope contemplated by the invention as claimed herewith.

What is claimed is:

1. A random access storage and separator device having a horizontal strip transport surface and capable of selecting a chosen one of a plurality of thin, flexible unit record strips arranged in a pack, comprising:

a storage magazine including a pair of opposed vertical wall plates spaced apart a predetermined distance and positioned parallel to each other on the horizontal strip transport surface, a pair of structural members spaced from said surface and parallel thereto and extending orthogonally between upper edges of said pair of wall plates, said wall plates and members jointly defining the periphery of an opening in said magazine, a plurality of selection rods extending between said wall plates perpendicular thereto, said strips including suspension means located near their top edges and being adapted for suspension above said transport surface by said selection rods and transverse thereto; means for actuating said selection rods for permitting the selective release of chosen strips and subsequent free-fall into edgewise contact with said transport surface, stop means disposed between said wall plates to define a maximum pack width therebetween less than said spacing between said wall plates, cover means comprising a conduit chamber including a rim portion formed to engage said wall plates and structural members in substantially air-tight relationship therewith, and a base portion disposed in said magazine opening and positioned in close proximity to the top edges of said suspended strips, said base portion including a pair of narrow, elongated slits symmetrically disposed about a center axis of said base portion and extending transverse to said strips at least over the maximum width of said pack so as to extend over all strips in said pack a prescribed distance beyond said stop means, means for applying a gas under pressure to said conduit chamber, said device being constructed to provide gas flow internally of said chamber obliquely toward said symmetrically disposed slits and through the latter, and being further adapted to provide a uniform, nonturbulent, laminar gas flow past said suspended strips and out between said structural members and said transport surface to effect a substantially uniform spacing of said strips along said selection rods.

2. The combination as recited in claim 1 wherein said base portion is positioned 5 to 10 mils above the top edges of said suspended strips, wherein the slit width is between 30 and 45 mils, and wherein said conduit chamber is divided by partition means into an upper and lower compartment communicating respectively with said gas applying means and said slits, said partition means including at least one circular aperture symmetrically disposed with respect to said slits in said base portion.

References Cited

UNITED STATES PATENTS

| | | | |
|---|---|---|---|
| 1,867,038 | 7/1932 | Upham | 271—26 |
| 3,307,557 | 3/1967 | Shebanow | 129—16.1 |

FOREIGN PATENTS

| | | |
|---|---|---|
| 1,209,726 | 9/1959 | France. |
| 1,013,184 | 12/1965 | Great Britain. |

JEROME SCHNALL, Primary Examiner